A. W. COX.

Assignor to REED & BARTON.

Combined Knife and Fork.

No. 9,687. Reissued May 3, 1881.

WITNESSES:

W. W. Hollingsworth

Edw. W. Byrn.

INVENTOR:

Arthur W. Cox

BY Munn & Co

ATTORNEYS.

UNITED STATES PATENT OFFICE.

ARTHUR W. COX, OF MALDEN, ASSIGNOR TO REED & BARTON, OF TAUNTON, MASSACHUSETTS.

COMBINED KNIFE AND FORK.

SPECIFICATION forming part of Reissued Letters Patent No. 9,687, dated May 3, 1881.

Original No. 88,370, dated March 30, 1869. Application for reissue filed April 6, 1881.

*To all whom it may concern:*

Be it known that I, ARTHUR W. COX, of Malden, in the county of Middlesex and State of Massachusetts, have invented a new and Improved Combined Knife and Fork; and I do hereby declare that the following is a full, clear, and exact description of the same, reference being had to the accompanying drawings, forming part of this specification.

The object of this invention is to provide a combined knife and fork better adapted for double use than any now made.

Figure 1:
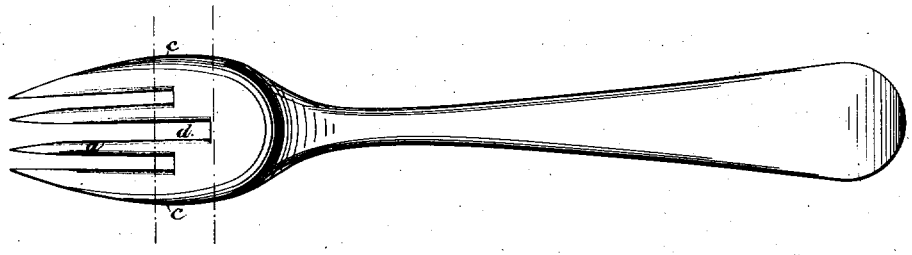
Figure 2:
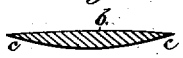
Figure 3:
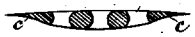

Figure 1 represents a plan view of the back of my improved implement, and Figs. 2 and 3 represent transverse sections.

I make the body of a common table-fork at the base of the tines *a* considerably broader than as ordinarily constructed, and also the outside tines at the said base, tapering them to a point and reducing the edges of the base and the outer tines to a knife-edge, shaping the front or upper surface of the tines and the base thereof to a plane, as represented at *b*, Fig. 2, and forming the under surface of the widened portions, as represented at *c*. I also make the bifurcations between the outer tines and those next thereto of less depth than the central bifurcation or those of the common fork, as represented at *d*. This arrangement greatly strengthens the outer tines, and thereby enables them to perform the functions of knives without bending under the great pressure it is sometimes necessary to impart to them.

The combined knife and fork, as heretofore constructed, has generally proved of little value as knives or forks, in consequence of the shortening of all the bifurcations or slots and the tines to gain strength, thus reducing the length of the tines so much as to give but a short cutting-edge, and making the body of the fork show a long space of solid metal, which was not only useless but gave a clumsy appearance to the whole article. In my invention I gain the same strength by simply shortening the outside bifurcations or slots, leaving the full length of an ordinary fork for cutting purposes on both edges and retaining the symmetry, while I increase the utility, of the whole. This reducing of the depth of the outer slots or bifurcations is a feature coacting with a knife-edged tine, which enhances the value of the fork when used as a knife without materially detracting from the value of the long bifurcation which is preserved in the center and gives it value as a fork, and I consider this the novel feature of my invention.

Having thus described my invention, what I claim as new is—

The improved combined knife and fork having its outer tines formed with cutting-edges and the bifurcations or slots next to these outer tines of less depth than the central bifurcation, substantially as shown and described.

The above specification of my invention signed by me this 26th day of April, 1875.

ARTHUR W. COX.

Witnesses:
T. E. FISKE,
F. L. CADY.